US011424548B2

(12) United States Patent
Achour

(10) Patent No.: US 11,424,548 B2
(45) Date of Patent: Aug. 23, 2022

(54) METHOD AND APPARATUS FOR A META-STRUCTURE ANTENNA ARRAY

(71) Applicant: Metawave Corporation, Palo Alto, CA (US)

(72) Inventor: Maha Achour, Palo Alto, CA (US)

( * ) Notice: Subject to any disclaimer, the term of this patent is extended or adjusted under 35 U.S.C. 154(b) by 263 days.

(21) Appl. No.: 16/401,036

(22) Filed: May 1, 2019

(65) Prior Publication Data

US 2020/0335873 A1 Oct. 22, 2020

Related U.S. Application Data

(60) Provisional application No. 62/665,493, filed on May 1, 2018.

(51) Int. Cl.

| | |
|---|---|
| ***H01Q 13/08*** | (2006.01) |
| ***H01Q 13/20*** | (2006.01) |
| ***H01Q 21/06*** | (2006.01) |
| ***H01Q 5/371*** | (2015.01) |
| ***H01Q 21/00*** | (2006.01) |
| ***H01Q 15/00*** | (2006.01) |

(Continued)

(52) U.S. Cl.
CPC ............. *H01Q 13/20* (2013.01); *H01Q 5/371* (2015.01); *H01Q 13/206* (2013.01); *H01Q 15/0086* (2013.01); *H01Q 21/005* (2013.01); *H01Q 21/065* (2013.01); *H01Q 1/3233* (2013.01); *H01Q 13/08* (2013.01); *H01Q 13/22* (2013.01)

(58) Field of Classification Search
CPC .... H01Q 13/20; H01Q 13/206; H01Q 21/037; H01Q 21/0043; H01Q 21/005; H01Q 21/065
See application file for complete search history.

(56) References Cited

U.S. PATENT DOCUMENTS 3,243,818 A * 3/1966 Holtzman ................ H01Q 5/42 343/771
3,328,800 A * 6/1967 Algeo .................... H01Q 25/00 343/768

(Continued)

OTHER PUBLICATIONS

M. Moeini-Farad, M. Khalaja-Amirhosseini, "Transmit Array Antenna Using Nonuniform Dielectric Layer. Advances in Wireless Communications and Networks," Book, vol. 3, No. 3, pp. 23-28, 2017.

(Continued)

*Primary Examiner* — Ab Salam Alkassim, Jr.
(74) *Attorney, Agent, or Firm* — Sandra Lynn Godsey

(57) ABSTRACT

Examples disclosed herein relate to a radiating structure having a plurality of slotted transmission lines, each transmission line including a plurality of boundary lines defining each transmission line, wherein slots are positioned in each transmission line and include a first set of slots interspersed with a second set of slots, the second set of slots having a size smaller than the first set of slots, and a plurality of irises positioned proximate each of the slots and along the length of each transmission line. The radiating structure also has an array of radiating elements proximate the slotted transmission lines so as to receive a transmission signal from the slotted transmission lines and generate a radiation pattern corresponding to the transmission signal.

20 Claims, 9 Drawing Sheets

(51) Int. Cl.
*H01Q 13/22* (2006.01)
*H01Q 1/32* (2006.01)

(56) References Cited

U.S. PATENT DOCUMENTS 3,599,216 A * 8/1971 Paine .................... H01Q 21/24 343/771
4,513,291 A * 4/1985 Drabowitch ....... H01Q 21/0043 343/771
5,019,831 A * 5/1991 Yee .................... H01Q 21/0043 343/770
5,173,714 A * 12/1992 Arimura ................ H01Q 13/16 343/770
5,638,079 A * 6/1997 Kastner .................. H01Q 13/22 343/768
5,757,329 A * 5/1998 Hoover .................. H01Q 13/18 29/600
5,977,924 A * 11/1999 Takei ................... H01Q 21/068 343/700 MS
6,043,790 A 3/2000 Derneryd et al.
6,147,658 A * 11/2000 Higashi .................... H01Q 3/12 333/167
6,351,244 B1 * 2/2002 Snygg .................... H01Q 25/04 343/770
6,429,825 B1 * 8/2002 Martek .................. H01Q 13/18 343/770
6,489,930 B2 * 12/2002 Teshirogi ............... H01Q 13/28 333/238
6,492,949 B1 12/2002 Breglia et al.
6,650,290 B1 11/2003 Chang et al.
6,686,890 B2 * 2/2004 James .................... H01Q 13/12 343/770
7,071,890 B2 * 7/2006 Tanaka ............... H01Q 15/0006 343/756
7,250,908 B2 7/2007 Lee
7,928,900 B2 4/2011 Fuller et al.
8,633,866 B2 1/2014 Saraband et al.
8,665,142 B2 * 3/2014 Shijo .................... H01Q 21/064 342/175
8,754,810 B2 6/2014 Guo et al.
8,803,739 B2 8/2014 Rajgopal et al.
9,545,923 B2 1/2017 Casse et al.
9,711,866 B1 7/2017 Doane et al.
9,806,431 B1 * 10/2017 Izadian .................. H01Q 13/10
9,912,068 B2 * 3/2018 Shijo ......................... G01S 7/03
10,431,895 B2 * 10/2019 Chung ...................... H01P 3/08
2001/0028329 A1 * 10/2001 Falk ..................... H01Q 21/245 343/770
2006/0114165 A1 * 6/2006 Honda ................. H01Q 21/005 343/785
2008/0266195 A1 * 10/2008 Yamaguchi ........ H01Q 21/0043 343/771
2010/0238085 A1 * 9/2010 Fuh ........................ H01Q 13/22 343/771
2010/0321265 A1 * 12/2010 Yamaguchi ........ H01Q 21/0043 343/771
2011/0316734 A1 * 12/2011 Svensson ................. H01Q 9/28 342/175
2012/0194399 A1 * 8/2012 Bily ................... H01Q 15/0006 343/772
2012/0206310 A1 * 8/2012 Apostolos ............ H01Q 21/068 343/771
2014/0015725 A1 * 1/2014 Enders .................. H01Q 13/22 343/771
2014/0375525 A1 12/2014 Shi
2015/0022421 A1 1/2015 Vigano et al.
2015/0222022 A1 * 8/2015 Kundtz .................. H01Q 21/24 343/771
2015/0222023 A1 * 8/2015 Shijo ......................... G01S 7/03 342/195
2015/0229028 A1 8/2015 Bily et al.
2015/0288063 A1 * 10/2015 Johnson ................... H01Q 3/24 342/352
2016/0011307 A1 1/2016 Casse et al.
2016/0013531 A1 1/2016 Casse et al.
2016/0195612 A1 * 7/2016 Shi ........................ G01S 13/931 342/27
2016/0233588 A1 8/2016 Bily et al.
2017/0244172 A1 * 8/2017 Hyde ................. H01Q 15/0053
2018/0040960 A1 * 2/2018 Johnson ................. H01Q 13/00
2019/0074588 A1 3/2019 Scarborough et al.
2019/0089065 A1 * 3/2019 Sikes ................. H01Q 21/0031
2019/0148822 A1 * 5/2019 Mobius ................ H01Q 1/3283 343/713
2019/0245276 A1 * 8/2019 Li ........................ H01Q 21/065
2019/0326684 A1 * 10/2019 Achour ............... G01S 13/4463
2019/0378356 A1 * 12/2019 Fang ...................... G07C 5/008
2019/0379132 A1 * 12/2019 Pelletti ................. H01Q 21/065
2020/0028259 A1 * 1/2020 Wang ................... H01Q 21/005
2020/0028260 A1 * 1/2020 Achour ................... G01S 7/006
2020/0044336 A1 * 2/2020 Dani ........................ H01Q 3/34
2020/0058987 A1 * 2/2020 Pelletti .................... G01S 7/032
2020/0059007 A1 * 2/2020 Wang ................... H01Q 21/005
2020/0067201 A1 * 2/2020 Rogers .................. H01P 11/002
2020/0127386 A1 * 4/2020 Yekan .................. H01Q 1/3233
2020/0168998 A1 * 5/2020 Salman .................. H01Q 13/18
2020/0194900 A1 * 6/2020 Doyle .................... H01Q 13/10
2020/0266543 A1 * 8/2020 Kaushal ............... H01Q 13/206
2020/0313288 A1 * 10/2020 Kona ..................... H01Q 13/10
2021/0013621 A1 * 1/2021 Nakamoto ............. H01Q 13/18
2021/0028549 A1 * 1/2021 Doyle .................... H01Q 13/20
2021/0167518 A1 * 6/2021 Achour .................... H01Q 3/44
2022/0026524 A1 * 1/2022 Maruyama ............. H01Q 21/12
2022/0082656 A1 * 3/2022 West ..................... G01S 7/2813

OTHER PUBLICATIONS

Rohde & Schwarz, "Millimeter-Wave Beamforming: Antenna Array Design Choices & Characterization," Version 2e, pp. 1-28, Oct. 28, 2016.

K. Konno, et al., "Beam scanning capabilityand suppression of endfireradiation of dipole arrayantennas coupled to two-wireparallel transmission line," Book, vol. 4, No. 12, pp. 1-5, Aug. 12, 2015.

R. L. Haupt, "Antenna Arrays: A Computational Approach," Book, pp. 401-463, John Wiley & Sons, Inc., New Jersey, United States, Sep. 2010.

D. Kim, "A Design of Switch Array Antenna with Performance Improvementfor 77 GHz Automotive FMCW Radar," Book, vol. 66, pp. 107-121, Agency for Defense Development, Yuseong, Korea, Apr. 3, 2016.

A. Abbaspour-Tamijani, "Novel Components for Integrated Millimeter-Wave Front-Ends," Dissertation, pp. 1-163, University of Michigan, Ann Arbor, United States, 2004.

X. Gu et al., "A Multilayer Organic Package with 64 Dual-Polarized Antennas for 28GHz 5G Communication," Paper, pp. 1-3, IBM Research, New York, United States, 2017.

L.-Y. Ji et al., "A reconfigurable beam-scanning partially reflective surface (PRS) antenna," 2015 9th European Conference on Antennas and Propagation (EuCAP), Lisbon, pp. 1-3, Apr. 2015.

E. A. Firouzjael, "mm-Wave Phase Shifters and Switches," Technical Report, No. UCB/EECS-2010-163, pp. 1-103, Electrical Engineering and Computer Sciences University of California at Berkeley, Berkeley, California, United States, Dec. 16, 2010.

J. Reis, et al., "Two-Dimensional Antenna Beamsteering Using Metamaterial Transmitarray," European Conference on Antennas and Propagation (EuCAP), Lisbon, Portugal, Aug. 2015.

C. A. Allen, et al., "Leaky-Waves in a Metamaterial-Based Two-Dimensional Structure for a Conical Beam Antenna Application," Paper, pp. 305-308, Department of Electrical Engineering, University of California at Los Angeles, Los Angeles, CA, United States, 2004.

J. Y. Lau et al., "Design and Characterization of a 6x6 Planar Reconfigurable Transmitarray," Paper, pp. 1-5, The Edward S. Rogers Sr. Dept. of Electrical and Computer Engineering, University of Toronto, Toronto, Canada, 2004.

L. Boccia, et al., "Multilayer Antenna-Filter Antenna for Beam-Steering Transmit-Array Applications," Paper, vol. 60, No. 7, pp. 1-14, IEEE Transactions on Microwave Theory and Techniques, Jul. 6, 2012.

(56) References Cited

OTHER PUBLICATIONS

M. W. Rousstia, "Switched-beam antenna array design for millimeter-wave applications," Design Report, pp. 1-136, Eindhoven University of Technology, Eindhoven, The Netherlands, Aug. 2011.
J. Schoebel et al., "Planar Antenna Technology for mm-Wave Automotive Radar, Sensing, and Communications," Radar Technology, Guy Kouemou (Ed.), Jan. 2010.
A.H. Abdelrahman, et al., "Transmission Phase Limit of Multilayer Frequency-Selective Surfaces for Transmitarray Designs," IEEE Trans. on Antennas and Propagation, vol. 62, No. 2, pp. 690-697, Feb. 2014.
C. Tripon-Canseliet, et al., "Contribution of MetaMaterials to Improvement of Scan Performance and Reconfigurability of Phased Array Antennas," International Radar Conference, Lille, France, pp. 1-3, Oct. 2014.
J. Reis, et al. "Two-Dimensional Transmitarray Beamsteering Using Stacked Tunable Metamaterials," Loughborough Antennas & Propagation Conference, Loughborough, UK, pp. 495-499, Nov. 2014.
Antenna Arrays: A Computational Approach, by Randy L. Haupt. Chapter 7, "Array Beamforming Networks," Copyright 2010 John Wiley & Sons, Inc., pp. 401-463.

* cited by examiner

METHOD AND APPARATUS FOR A META-STRUCTURE ANTENNA ARRAY

CROSS-REFERENCE TO RELATED APPLICATIONS

This application claims priority to U.S. Provisional Application No. 62/665,493, filed on May 1, 2018, and incorporated herein by reference in their entirety.

BACKGROUND

In a wireless transmission system, such as radar or cellular communications, the size of the antenna is determined by applications, configuration of the antenna, the design and structure of the radiating elements, the transmission characteristics, goals of the system, manufacturability and other requirements and/or restrictions. With the widespread application of wireless applications, the footprint and other parameters allocated for a given antenna, or radiating structure, are constrained. In addition, the demands on the capabilities of antenna systems continue to increase, such as increased bandwidth, finer control, increased range and so forth.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

Examples described herein provide antenna structures having radiating elements to increase performance for vehicular radar modules in particular. These include a variety of radiating elements and array structures. Each array of elements receives signals and power through a feed network which divides the power from a given source or sources to the various portions of the array and/or elements. This power distribution is referred to herein as a feed network and there are structures and configurations within the feed network designed to increase performance of the antenna. The feed network design provides a mechanism to control the radiated beam, such as for beam steering, as well as to craft the shape of the beam, such as through tapering.

The examples provided herein are described in the context of a vehicular application; however, the examples are applicable in a wide-range of applications such as in communication systems or other applications that incorporate radiating elements and feed structures. Numerous specific details are set forth in the following description to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Figure 1:
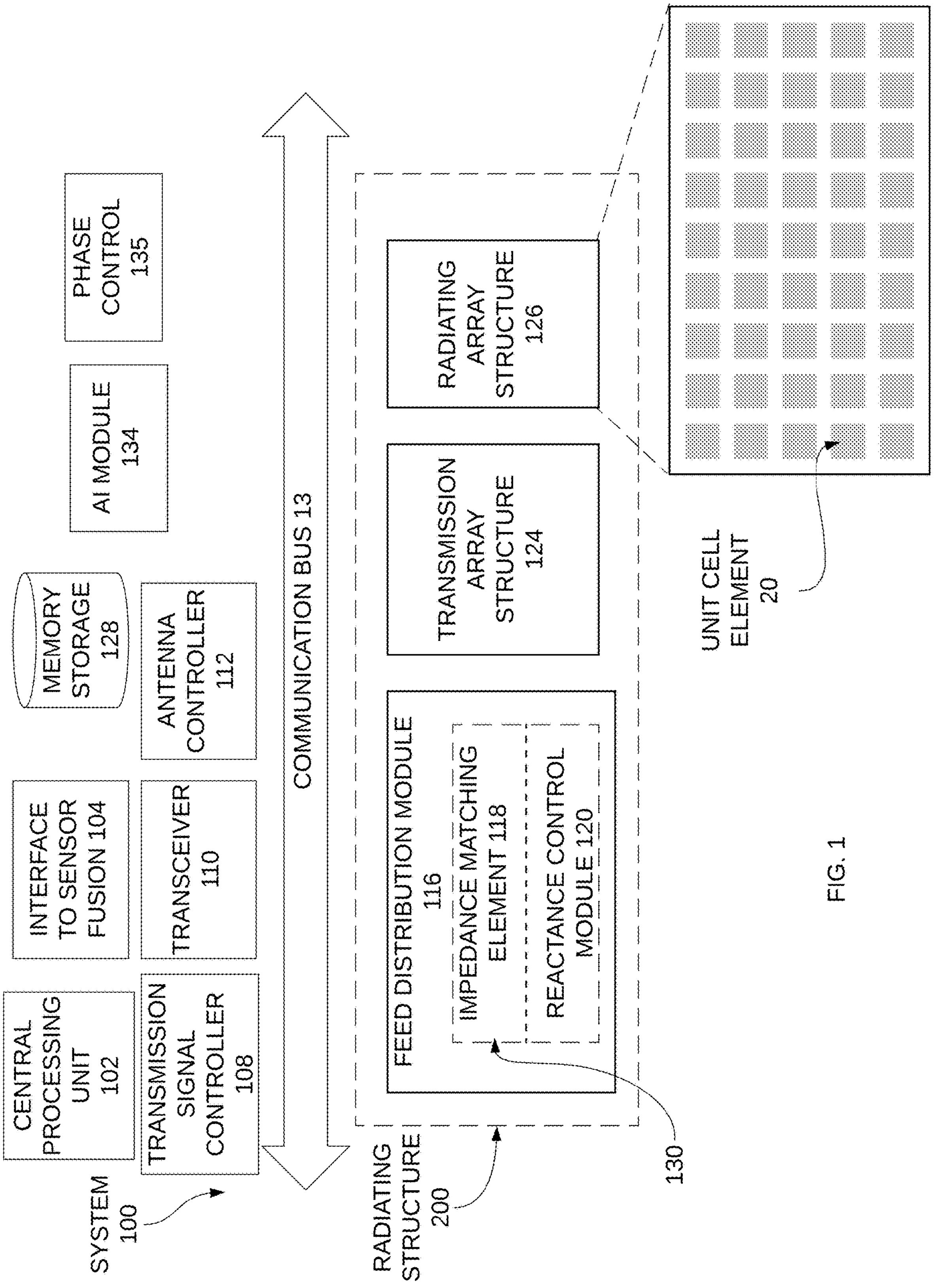
FIG. 1 illustrates an antenna system, according to various examples.

FIG. 1 illustrates an antenna system 100 that includes the components of an automotive radar system, such as to support autonomous driving and/or Automated Driver Assist Systems ("ADAS") which provide automated information to the driver. The system 100 includes a central processing unit 102 controlling some of the modules and a communication bus 13 to communicate signals, information and instructions within the system 100. The system 100 includes a radiating structure 200 for generating over-the-air signals, which in this case are used as radar signals to transmit signals having a specific modulation and to receive reflections or echoes of the transmitted signals from which the system detects objects and derives various information about the detected objects. A transceiver 110 acts under operation of a transmission signal controller 108 to operate an antenna controller 112 that controls the radiating structure 200. The system 100 provides the derived information to a sensor fusion (not shown) through an interface to sensor fusion 104. The sensor fusion may also require raw data, the analog information received at the radiating structure 200. In this way the system 100 acts to achieve the goals of the automotive system.

As in FIG. 1, the antenna system 100 includes interfaces with other modules, such as through the interface to sensor fusion 104 where information is communicated between the antenna system 100 and a sensor fusion module (now shown). The antenna system 100 includes an antenna controller 112 to control the generation and reception of electromagnet radiations, or beams. The antenna controller 112 determines the direction, power and other parameters of the beams and controls the radiating structure 200 to achieve beam steering in various directions. The design of the system 100 determines the range of angles over which the antenna may be steered. Steering is to change the direction of the main lobe of a radiation beam toward a specific direction.

For example, where the beam has a boresight original direction approximately perpendicular to the plane of the antenna, the system 100 may steer the beam x degrees in a first angular direction and y degrees in a second angular direction. The angles x and y may be equal or may be different. The system 100 may steer the beams in an azimuth, or horizontal, direction with respect to the antenna plane or may steer in an elevation, or vertical, direction with respect to the antenna plane. A 2-dimensional antenna steers in both azimuth and elevation.

The antenna system 100 enables control of reactance, phase and signal strength in the feed network paths, referred to herein as transmission lines. A given transmission line is considered herein to be the path from a signal source to a given portion of the antenna array or to a given radiating element. The radiating structure 200 includes a power divider circuit, and so forth, along with a control circuit 130 therefor. The control circuit 130 includes a reactance control module ("RCM") 120, or reactance controller, such as a variable capacitor, to change the reactance of a transmission circuit and thereby control the characteristics of the signal propagating through a transmission line. The RCM 120 is controlled by antenna controller 112 to control the phase of a signal radiated through individual antenna elements of a radiating array structure 126. The antenna controller 112 may employ a mapping of the reactance control options to the resultant radiation beam options. This may be a look-up table or other relational database used to control the reactance control module 120. In various examples, the RCM 120 may be a varactor, a distributed varactor network, or phase shift network that changes the phase of a signal. The RCM 120 in some examples is integrated into an amplifier, such as in a Low Noise Amplifier ("LNA") for received signals and a Power Amplifier ("PA") or High-Power Amplifier ("HPA") for a transmit path.

The control circuit 130 also includes an impedance matching element 118 to match an input impedance at the connection to the radiating array structure 126. The impedance matching element 118 and the reactance control module 120 may be configured throughout the feed distribution module 116 or may be proximate one another. The components of the control circuit 130 may include control signals, such as a bias voltage, to effect specific controls. These control signals may come from other portions of the system 100, such as in response to an instruction from sensor fusion received through the interface 104. In other examples, alternate control mechanisms are used.

For structures incorporating a dielectric substrate to form a transmission path, such as a Substrate Integrated Waveguide ("SIW"), a layered antenna design, or a folded antenna design, reactance control may be achieved through integration with the transmission line, such as by inserting a microstrip or strip line portion that will support the RCM. Where there is such an interruption in the transmission line, a transition is made to maintain signal flow in the same direction. Similarly, the reactance control structure may require a control signal, such as through a DC bias line or other control means, to enable the system 100 to control and adjust the reactance of the transmission line. Some examples include a structure(s) that acts to isolate the control signal from the transmission signal. In the case of an antenna transmission structure, the isolation structure may be a resonant control module that serves to isolate DC control signal(s) from AC transmission signals.

The examples disclosed herein are applicable in wireless communication and radar applications, and in particular those incorporating radiating elements, such as meta-structures ("MTSs") or metamaterial ("MTM") structures capable of manipulating electromagnetic waves using engineered radiating structures. Additionally, the disclosed examples provide methods and apparatuses for generating wireless signals, such as radar signals, having improved directivity, reduced undesired radiation patterns aspects, such as side lobes. The disclosed examples provide antennas with unprecedented capability of generating Radio Frequency ("RF") waves for radar systems. These antennas enable improved sensor capability and support autonomous driving by acting in one of the sensors (in this case, a radar sensor) used for object detection. The examples are not limited to these applications and may be readily employed in other antenna applications, such as wireless communications, 5G cellular, fixed wireless and so forth.

In cellular systems, the present examples enable systems of ultra-wide band in millimeter wave spectrum at high frequency, making these systems dense, ultra-fast, low latency, reliable, and expansive. There is more capacity for devices, data and communications from unified connectivity. The present examples enable for hyper connected view for 5G wireless systems to provide higher coverage and availability in dense networks. These new services include machine-to-machine ("M2M"), Internet of things ("IoT") applications with low power and high throughput.

In various examples, the system 100 has antenna beam steering capability integrated with Radio Frequency Integrated Circuits ("RFICs"), such as millimeter wave ICs ("MMICs") for providing RF signals at multiple steering angles. The antenna may be a meta-structure antenna, a phase array antenna, or any other antenna capable of radiating RF signals in millimeter wave frequencies. A meta-structure, as generally defined herein, is an engineered structure capable of controlling and manipulating incident radiation at a desired direction based on its geometry. The meta-structure antenna may include various structures and layers, including, for example, a feed or power division layer to divide power and provide impedance matching, an RF circuit layer with RFICs to provide steering angle control and other functions, and a meta-structure antenna layer with multiple microstrips, gaps, patches, vias, and so forth. The meta-structure layer may include a metamaterial layer. Various configurations, shapes, designs and dimensions of the beam steering antenna may be used to implement specific designs and meet specific constraints.

The present examples provide smart active antennas with unprecedented capability of manipulating RF waves to scan an entire environment in a fraction of the time of current systems. The present examples provide smart beam steering and beam forming using MTS and/or MTM radiating structures in a variety of configurations, wherein electrical changes to the antenna are used to achieve phase shifting and adjustment reducing the complexity and processing time and enabling fast scans of up to approximately 360° field of view for long range object detection.

System 100 includes a feed distribution module 116 having a plurality of transmission lines (not shown in FIG. 1) configured with discontinuities within the conductive material and having a lattice structure of unit cell radiating elements proximate the transmission lines. The feed distribution module 116 has a coupling design to provide paths for an input signal through the transmission lines, or a portion of the transmission lines, in the feed distribution module 116.

The present examples illustrate the flexibility and robust design of the present examples in antenna and radar design. In some examples, the coupling design forms a power divider structure that divides the signal among the plurality of transmission lines, wherein the power may be distributed equally among the N transmission lines, or may be distributed according to another scheme, wherein the N transmission lines do not all receive a same signal strength. For example, tapering may be introduced by reducing the signal strength as it moves toward a given direction(s). This results in focusing the power according to the directivity of the beam while reducing side lobes of the beam.

The feed distribution module 116 of system 100 includes impedance matching element 118 and reactance control 120. The feed distribution module 116 is coupled to the transmission array structure 124 which has N transmission paths that are formed to guide the transmission signal through the transmission array structure, which is proximate to and underlying the radiating array structure 126. In various examples, transmission signals propagate through paths in the transmission array structure 124 and radiate up to excite the radiating elements of the radiating array structure 126. A radiating element, such as unit cell element 20, radiates the signal over the air. Together the elements of radiating array structure 126 form a directed radiation beam. The layout of system 100 of FIG. 1 is drawn to illustrate functional operations and is not drawn as the system 100 is physically configured.

In some examples, the impedance matching element(s) 118 incorporate reactance control element(s) 120 to modify a capacitance or reactance of elements of the radiating array structure 126. The impedance matching element 118 may be configured to match the input signal parameters with radiating elements, and therefore, there are a variety of configurations and locations for this element 118. The impedance matching element 118 and the reactance control module 120 may include a plurality of components, a single component, an ASIC, or other structure so as to achieve the given function in the desired circuit.

As described in the present examples, a reactance control module 120 is incorporated to adjust the effective reactance of a transmission line within transmission array structure 124 and/or a radiating element within radiating array structure 126, wherein said transmission line feeds radiating elements. Such a reactance control module 120 may be a varactor diode having a bias voltage applied by a controller (not shown). The varactor diode acts as a variable capacitor when a reverse bias voltage is applied. As used herein, the reverse bias voltage is also referred to herein as reactance control voltage or varactor voltage. The value of the reactance, which in some examples is capacitance, is a function of the reverse bias voltage value. By changing the reactance control voltage, the capacitance of the varactor diode is changed over a given range of values. Alternate examples may use alternate methods for changing the reactance, which may be electrically or mechanically controlled. The reactance control module 120 changes a phase of the transmission signal through multiple paths resulting in a directed radiation beam having the desired beam shape. In some examples, a varactor diode may also be placed between conductive areas of a radiating element.

With respect to a radiating element, changes in varactor voltage produce changes in the effective capacitance of the radiating element. The change in effective capacitance changes the behavior of the radiating element and in this way the varactor may be considered as a tuning element for the radiating elements in beam formation. In some examples, the reactance control elements in module 120 are positioned within the radiating array structure 126, such as between conductive portions of an element, such as unit cell element 20 having a MTS or MTM design.

The reactance control module 120 enables control of the reactance of a fixed geometric transmission line. Transmission lines are defined as conductive paths from the source signal to an input to the radiating array structure 126, wherein the radiating elements are arranged or organized as super elements, which may be rows, columns or portions of the radiating array structure 126. One or more reactance control mechanisms 120 may be placed within a transmission line. Similarly, reactance control module 120 may be placed within multiple transmission lines to achieve a desired result. The reactance control module 120 may have individual controls to provide a change in reactance of one or more transmission lines. In other examples, multiple reactance control mechanisms 120 have common control, such as a single bias voltage applied to multiple reactance control mechanisms 120. In some examples, control applied to a first reactance control mechanism acts as a trigger to other control mechanisms, such as where a modification to a first reactance control mechanism is a function of a modification to a second reactance control mechanism. Some examples position reactance control elements 120 in some but not all of the transmission lines of transmission array structure 124. Each design is purposed to achieve a desired goal. In a flexible design, these reactance control elements 120 may be enabled, controlled and disabled.

In the vehicular applications described herein, the reactance control module 120 enables fast beam steering so as to achieve a sweep of the field of view from the vehicle. This may be a rastered scan, a patterned scan, an ad hoc scan or other design, where the radar signal is tasked with detecting objects that my impact the safety and/or performance of the vehicle. The scan may be controlled by a perception engine that identifies an object or condition and directs the radar beam accordingly. These examples, therefore, support autonomous driving at various levels with improved sensor performance, all-weather/all-condition detection, advanced decision-making algorithms and interaction with other sensors through sensor fusion. This is because electromagnetic signals are not hindered by dark environments, rainy environments, foggy environments and so forth, which prefer radar over other sensors that rely on more favorable environmental conditions. The radar signals and perception results may be combined with a variety of other type sensors in a vehicle so as to optimize performance and security.

The configurations described herein optimize the use of radar sensors, as radar is not inhibited by weather conditions, such as for self-driving cars. The ability to capture environmental information earlier than other sensors makes the radar sensors significantly preferable aids to control a vehicle, allowing anticipation of hazards and changing conditions. The sensor performance is also enhanced with the radiating structures and configurations described herein, enabling long-range and short-range visibility to the vehicle controller(s) and sensor fusion. In an automotive application, short-range is considered within 30 meters of a vehicle, such as to detect a person in a cross walk in front of the vehicle; and long-range is considered to be 200 meters or more, such as to detect other cars, trucks, and obstacles on a highway. This considers the presence of mobile and stationary objects, as well as the movement of an object. The examples disclosed herein provide automotive radars capable of reconstructing the world around them and are effectively a radar "digital eye," having true 3D vision and capable of human-like interpretation of the world.

In some examples, a radar system steers a highly-directive RF beam that can accurately determine the location and speed of road objects. These examples are not prohibited by weather conditions or clutter in an environment. The present examples use radar to provide information for 2D image capability as they measure range and azimuth angle, providing distance to an object and azimuth angle identifying a projected location on a horizontal plane, respectively, without the use of traditional large antenna elements.

The present examples provide methods and apparatuses a meta-structure antenna array that provides enhanced beam steering by adjusting the phase of one or more elements of the array. The use of FMCW as a transmitted signal in the autonomous vehicle range, which in the US is approximately 77 GHz and has a 5 GHz range, specifically, 76 GHz to 81 GHz, reduces the computational complexity of the system, and increases the vehicular speed attainable with autonomy. The present examples accomplish these goals by taking advantage of the properties of shaped structures such as MTSs or MTM structures coupled with novel feed structures.

MTSs and MTMs derive their unusual properties from structure rather than composition and they possess exotic properties not usually found in nature. The antennas described herein may take any of a variety of forms, some of which are described herein for comprehension; however, this is not an exhaustive compilation of all the possible configurations. The reactance control mechanisms in the antennas change a behavior of the meta-structures and/or metamaterials and thus change the direction of a transmitted beam. In other words, the process adjusts a reactance of a radiating element and that results in a change in phase of the signal transmitted from that element. The phase change steers the beam, wherein a range of voltage controls corresponds to a set of transmission angles. A capability of the system is specified as the range of transmission angles.

The following discussion refers to a vehicular radar system application; this is provided for clarity of understanding and not as a limiting application. Self-driving cars, or autonomous vehicles, are described with respect to specific levels of capabilities. Levels 3 to 5 have autonomous driving features, while Levels 0 to 2 do not. These examples are also applicable to ADAS, which provide information to the driver for increased awareness.

Starting with the most independent type control, Level 5 is fully automated driving without any input from the driver; hence there is no need for a steering wheel, brakes, accelerator and so forth, as the automobile is fully autonomously supervised. The Level 5 vehicle, as defined by the National Highway Safety Board ("NTHS"), is capable of performing all driving functions under all conditions. The driver may have the option to control the vehicle, but this is not required. Full automation has no human driver and is solely a passenger vehicle. Level 5 is the goal of current design efforts and has the most stringent requirements. The Level 5 vehicle must comprehend environment and circumstances and react accordingly. Once Level 5 is achieved, the next developments will relate to interfacing and communicating with other vehicles, V2V, and safety considerations, such as how to manage an unavoidable accident. Level 4 is highly automated; the vehicle is capable of performing all driving functions under certain conditions. The driver has the option to control the vehicle as Level 4 is not fully autonomous. In a Level 4 vehicle driving is managed autonomously almost all the time, with a few limited circumstances, such as poor weather conditions. In rain or snow, the vehicle may not allow engagement of self-driving capabilities. Level 3 is conditionally automated, where a driver is needed, but the vehicle is capable of monitoring the environment. The drive must be alert and ready to take control of the vehicle at all times when the vehicle systems are no longer capable. The driver is able to take their eyes off the road but is still required to take over at a moment's notice when the system is no longer capable given a situation or environment. An example of a Level 3 feature is to trigger automated driving at slow speeds, such as stop and go traffic up to a maximum speed. These may be implemented where barriers separate oncoming traffic.

The lower levels have no independent operation but have no automation to varying levels of automation. Level 2 is partially automated; the vehicle has combined automated functions, like acceleration and steering, but the driver must remain engaged with the driving tasks and monitor the environment at all times. Level 2 vehicles can assist with both steering and braking at the same time, but still require full driver attention; these are capable of Automated Cruise Control ("ACC") and lane centering to steer the car so as to maintain a position in the center of a lane. Current Level 2 vehicles enable the driver to take their hands off the steering wheel, while cameras are aimed at the driver to detect inattentiveness and disable the automated steering, requiring the driver to take control. There are a few vehicles that currently fall into Level 2 at this time. Level 1 is driver assisted where the vehicle is controlled by the driver, but some driving assist features may be included in the vehicle design. A Level 1 vehicle can assist with steering or braking, but generally not at the same time, such as ACC to handle braking so as to keep a specified distance from the car in front of you. Level 1 vehicles have been in production for quite some time as of the time of the present examples. Level 0 has no automation; the vehicle is controlled fully by the driver with minimal to no driving assist features. Level 0 has no self-driving capabilities at all; these were still in production as of 2010.

In the developing vehicle systems, the percentage of automation and independent capabilities are increasing, requiring the vehicle to sense its environment and circumstances and react accordingly. Sensors must perform fast enough to respond at least as quickly as a human driver; and as sensors are computer controlled, it is expected that they outperform human driving capabilities. Radar is an ideal sensor for vehicle control as it not only is able to perform under almost all-weather conditions and throughout the day and night, but it provides information from an analog signal with very little processing. In comparison, the data must be managed by extensive digital processing in a camera sensor. The radar system's reduction in latency enables faster response times that are required when a vehicle is travelling at high speeds, such as over 60 mph.

Additionally, sensors must scan a large field of view, meaning that typical sensors must scan that area over a time period. To scan an area, e.g., a field of view, with a radar sensor requires beam steering to change the direction of a main lobe of a radiation pattern. Conventionally this was done by switching the antenna elements or providing a signal to different antenna elements at different times. Similarly, some systems change the relative phases of the RF signals driving the antenna elements. These methods are controlled by digital systems to control directivity of the main lobe of the beam. Throughout this discussion we will refer to the antenna direction as the direction of the main lobe of the beam.

There are different methods to generate a radiation beam, digital beam forming and analog beam forming. Analog uses phased array antenna structures which combine at an RF center frequency, with each element or group of elements having a different phase. The signals from all the elements are transmitted from one transmit source, referred to herein as a transmit channel or path. The received signals are also combined to form a single input to a receive channel and down-converted as one signal.

Digital Beam Forming ("DBF") applies individual transmit channels to each antenna element, or group of elements. Multiple independent beams steered in all directions are formed in the DBF process, which improves dynamic range, controls multiple beams and provides control of amplitude and phase quickly. Down converting to an Intermediate Frequency ("IF") and digitizing the signals is realized at each individual antenna element, or group of elements. The signals are received and processed individually for combination at summing point.

The present examples use inventive analog beam forming techniques to provide the benefits of both analog and digital processing. Control of the antenna elements to generate and direct a beam is done in the analog domain. Processing and control are done in the digital domain, applying perception capabilities to quickly and accurately understand the environment and circumstances of the vehicle. The present examples change the reactance of one or more antenna elements, or groups of elements, so as to form the shape and direction of the beam and also to change the directivity of a beam.

Returning to FIG. 1, a system 100 according to the present examples, has a radiating array structure 126 coupled to an antenna controller 112 to control the behavior of antenna elements of radiating array structure 126, a central processor 102 controlling operation of the radar system 100 and the individual components therein, and a transceiver 110 to generate a radar transmit signal and receive the reflections, echoes or return signals. The transceiver 110 may be a single unit capable of transmit and receive functions or may be multiple units, including a receive unit and a transmit unit, each handling the respective signals. A transmission signal controller 108 generates the specific transmission signal, such as an FMCW signal, which is used as for radar sensor applications as the transmitted signal is modulated in frequency, or phase.

As illustrated in FIG. 1, the functional modules may be combined or expanded to increase functionality. The transceiver signal controller 108 may have predefined signal formats or may receive instructions from a sensor fusion or other vehicle control. Continuous wave radar transmits at a known stable frequency. Radio energy is transmitted and received from reflections off objects, referred to herein as targets. The use of a continuous wave signal enables the measurement of Doppler effects and provides a system that is relatively immune to interference from stationary objects and slow-moving clutter. Doppler effect on the frequency of a returned signal or reflection, gives a direct and accurate measure of the radial component of a target's velocity relative to the radar system. Here the Doppler effect is the difference in frequency of the transmitted wave and the received wave and corresponds to the velocity data of objects detected. It is a measure of how the object's motion altered the frequency of the received signal. The time taken for the signal to return provides the distance to the target, referred to as the range. The combination of range and Doppler information gives accurate information as to targets in the environment. These techniques provide highly accurate information as to range and velocity from a same signal. The circuitry to process such signals is also reduced as signal processing is performed after mixing the signals received at the antenna elements so the operations are performed in the analog domain reducing latency and computational lag as compared to camera and other computationally-intensive operations. Systems relying on optical data are not only limited in environmental and circumstantial operation but also rely heavily on extensive computation. Still further, radar provides safety compared to other systems employing pulse radiation with high peak power, such as laser solutions referred to as lidar.

Many of the present examples apply modulation schemes and configurations that enable discovery of range, velocity, acceleration, cross-sectional area, and angle of arrival. An FMCW signal is considered in the examples herein as it enables the radar system 100 to measure range and velocity of the target, detected object This type of detection is a key component of automotive systems to enable autonomous vehicles. Other modulation types may be incorporated according to the desired information and specifications of a system and application. Within FMCW formats, there are a variety of modulation patterns that maybe used within FMCW, including triangular, sawtooth, rectangular and so forth, each having advantages and purposes. For example, sawtooth modulation may be used for large distances to a target and using the Doppler frequency change; a triangular modulation expands the information available from the Doppler frequency information to determine acceleration of a target, and other waveforms present different capabilities. Other modulation schemes may be employed to achieve desired results.

The received radar information is stored in a memory storage unit 128, wherein the information structure may be determined by the type transmission and modulation pattern. The stored information may be processed in parallel with radar operation to detect patterns and enable the system 100 to improve operation. In some examples, machine learning is used to process received information and predict a class of object or other object identification. These systems may employ pattern-matching techniques, such as using neural network techniques.

The transmission signal controller 108 may also be used to generate a cellular modulated signal, such as Orthogonal Frequency Division Multiple ("OFDM") signal. The transmission feed structure 116 may be used in a variety of systems. In some systems, the signal is provided to the system 100 and the transmission signal controller 108 may act as an interface, translator or modulation controller, or otherwise as required for the signal to propagate through a transmission line system.

The present examples are described with respect to system 100, where the radiating structure 200 includes a feed distribution module 116 having an array of transmission lines feeding a radiating array structure 126. In FIG. 1, the components of the radiating structure 200 are illustrated as individual modules based on function for clarity of understanding; however, these may be combined with each other, such as to position the reactance control module 120 within the feed distribution module 116. Similarly, the transmission array structure 124 described herein is positioned proximate to and underlying the radiating array structure 126.

The transmission line has various portions, wherein a first portion receives a transmission signal as an input, such as from a coaxial cable or other supply structure, and a second portion where the transmission path is divided into individual paths to each antenna element or group of elements. The transmission array structure 124 includes a dielectric substrate(s) sandwiched between conductive layers. The transmission signal propagates through the substrate portion, wherein conductive structures are configured for power division. In the present examples, the power division is a corporate feed-style network resulting in multiple transmission lines that feed multiple antenna elements or groups of elements.

Arrangement of the antenna elements into individual paths through a group of antenna elements is referred to as a super element. In a symmetric array of antenna elements, a super element may be a row or column of the array. Each super element includes a dielectric substrate portion and a conductive layer having a plurality of slots. The transmission signal radiates through these slots in the super elements of the transmission array to an array of MTS and/or MTM elements positioned proximate the super elements. In the examples presented herein the MTS and/or MTM array is overlaid on the super elements, but a variety of configurations may be implemented. The super elements effectively feed the transmission signal to the MTS/MTM array elements, from which the transmission signal radiates. Control of the MTS/MTM array elements results in a directed signal or beamform.

Continuing with FIG. 1, the radiating structure 126 includes individual radiating elements, which are individual unit cells. These cells may have a variety of shapes, dimensions and layouts. For an MTS or MTM unit cell, specifically, the design may be defined by degrees of freedom resulting from the variety of conductive structures and patterns. These characteristics and makeup determine how a received transmission signal is radiated from the radiating array structure 126. The elements of the radiating array structure 126 may be configured in a periodic arrangement of unit cells, wherein the dimensions of the unit cells are smaller than a transmission wavelength.

In examples employing MTM unit cells, each element may have unique properties, such as a negative permittivity and permeability resulting in a negative refractive index, and so forth. In some examples, these structures may be classified as Left-Handed Materials ("LHM"). The use of LHM enables behavior not achieved in classical structures and materials. As seen in the present examples, interesting effects may be observed in propagation of electromagnetic waves, or transmission signals. This type of elements may be used for several interesting devices in mm wave, microwave and terahertz engineering such as antennas, sensors, matching networks, and reflectors, such as in telecommunications, automotive and vehicular, robotic, biomedical, satellite and other applications.

The radiating elements are structures engineered to have properties not found in nature and are typically arranged in repeating patterns. For antennas, these elements may be built at scales much smaller than the wavelengths of transmission signals radiated from them, with properties derived from the engineered and designed structures rather than from the base material forming the structures. Precise shape, dimensions, geometry, size, orientation, arrangement and so forth result in the smart properties capable of manipulating EM waves by blocking, absorbing, enhancing, or bending waves.

In various examples, the antenna controller 112 receives information from within system 100, such as from the radiating structure 200 and from the interface 104 to a sensor fusion module. In a vehicular control system, a sensor fusion module typically receives information (digital and/or analog form) from multiple sensors and then interprets that information, making various inferences and initiating actions accordingly. One such action is to provide information to antenna controller 112, wherein that information may be the sensor information or may be an instruction to respond to sensor information and so forth. The sensor information may provide details of an object detected by one or more sensors, including the object's range, velocity, acceleration, and so forth. The sensor fusion may detect an object at a location and instruct the antenna controller 112 to focus a beam on that location. The antenna controller 112 then responds by controlling the transmission beam through the reactance control module 120 and/or other control mechanisms for the radiating structure 200 to change the direction of the beam. The instruction from the antenna controller 112 acts to control radiation beams, wherein a radiation beam may be specified by parameters such as beam width, transmit angle, transmit direction and so forth. In this way, the system 100 may generate broad width beams and narrow, pencil point beams.

In some examples, the antenna controller 112 determines a voltage matrix to apply to the reactance control mechanisms within the RCM 120 coupled to the radiating structure 200 to achieve a given phase shift or other parameters. In some examples, the radiating array structure 126 is adapted to transmit a directional beam without incorporating digital beam forming techniques, but rather through active control of the reactance parameters of the individual elements in array 126 that make up the radiating array structure 126.

Transceiver 110 prepares a signal for transmission, such as a signal for a radar device, wherein the signal is defined by modulation and frequency. The signal is received by each element of the radiating structure 200 wherein the phase of the radiating array structure 126 is adjusted by the antenna controller 112 to shape and steer the beam. In some examples, transmission signals are received by a portion, or subarray, of the radiating array structure 126. Subarrays enable multiple radiation beams to operate sequentially or in parallel. The present examples consider application in autonomous vehicles as a sensor to detect objects in the environment of the car. Alternate examples may be applicable in wireless communications, medical equipment, sensing, monitoring, and so forth. Each application type incorporates designs and configurations of the elements, structures and modules described herein to accommodate their needs and goals.

In system 100, a signal is specified by antenna controller 112, which may be in response to an Artificial Intelligence ("AI") module 134 from previous signals, or may be from the interface to sensor fusion 104, or based on program information from memory storage 128. There are a variety of considerations to determine the beam formation, wherein this information is provided to antenna controller 112 to configure the various elements of radiating array structure 126, which are described herein. The transmission signal controller 108 generates the transmission signal and provides the same to feed distribution module 116, which provides the signal to transmission array structure 124 and radiating array structure 126.

As illustrated, radiating structure 200 includes the radiating array structure 126, composed of individual radiating elements discussed herein. The radiating array structure 126 may take a variety of forms and is designed to operate in coordination with the transmission array structure 124. Individual radiating elements in radiating array structure 126, such as unit cell element 20, correspond to elements within the transmission array structure 124. One example is illustrated in which the radiating array structure is an 8×16 cell array, wherein each of the unit cell elements has a uniform size and shape; however, alternate and other examples may incorporate different sizes, shapes, configurations and array sizes. When a transmission signal is provided to the radiating structure 200, such as through a coaxial cable or other connector, the transmission signal propagates through the feed distribution module 116 to the transmission array structure 124, through which the transmission signal radiates to radiating array structure 126 for transmission through the air. In FIG. 1, the transmission array structure 124 and the radiating array structure 126 are illustrated side-by-side, but the configuration of the present examples positions the radiating array structure parallel to the transmission array structure as illustrated herein.

The impedance matching element 118 and the reactance control module 120 may be positioned within the architecture of feed distribution module 116; one or both may be external to the feed distribution module 116 for manufacture or composition as an antenna or radar module. The impedance matching element 118 works in coordination with the reactance control module 120. The illustrated example enables phase shifting of radiating signals from radiating array structure 126. This enables a radar unit to scan a large area with the radiating array structure 126. For vehicle applications, sensors seek to scan the entire environment of the vehicle. These sensors then may enable the vehicle to operate autonomously, or may provide driver assist functionality, including warnings and indicators to the driver, and controls to the vehicle. The present examples are a dramatic contrast to the traditional complex systems incorporating multiple antennas controlled by digital beam forming. The present examples increase the speed and flexibility of conventional systems, while reducing the footprint and expanding performance.

Figure 2:
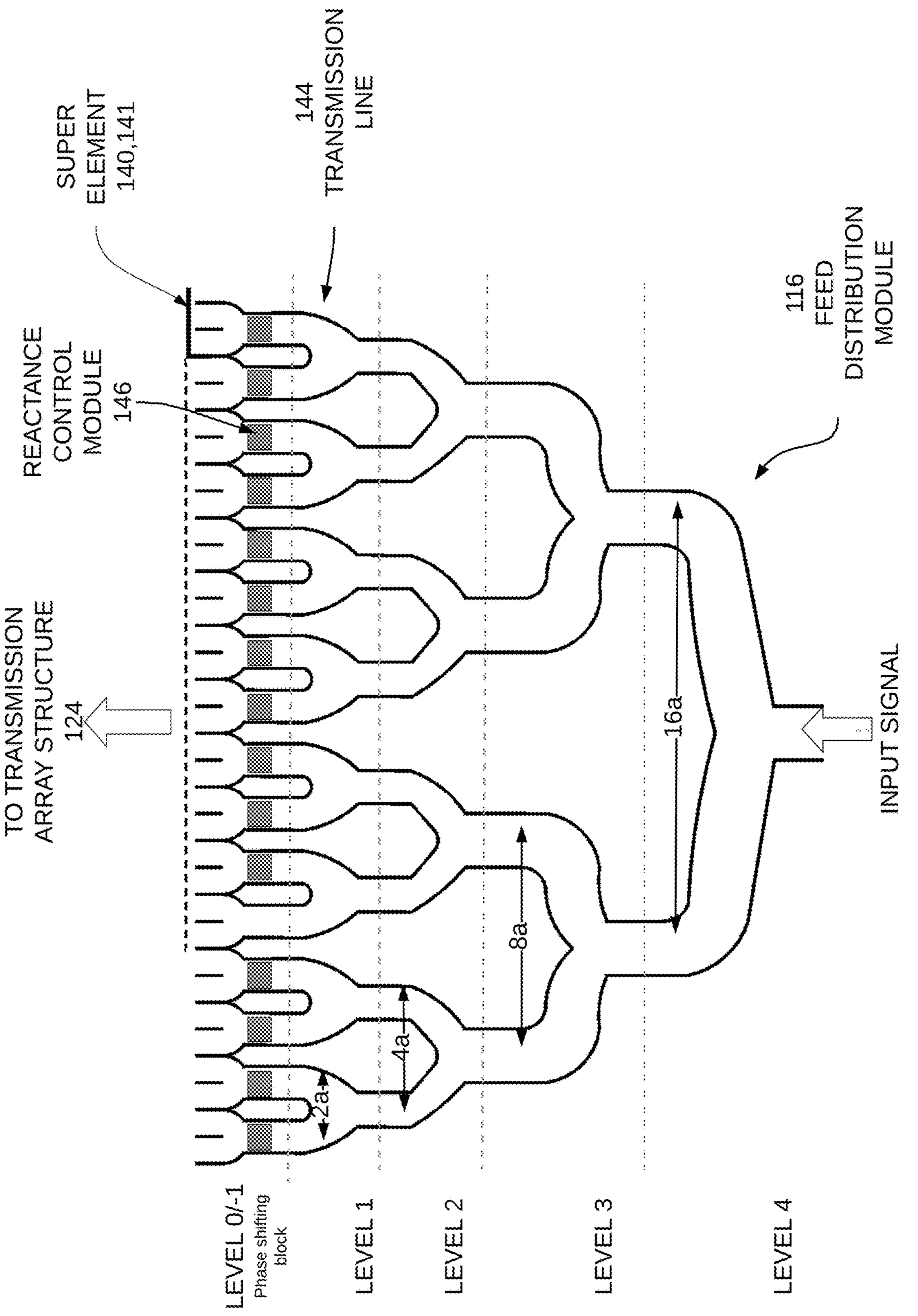
FIG. 2 illustrates a corporate feed for a transmission line array, such as for a radiating structure according to various examples.

FIG. 2 illustrates a perspective view of one example of radiating structure 200 having feed distribution module 116 coupled to transmission array structure 124, which feeds radiating array structure 126. The feed distribution module 116 extends and couples to the transmission array structure 124. The radiating array structure 126 of this example is configured as a lattice of unit cells radiating elements (FIG. 1). The unit cells are MTSs or MTM engineered conductive structures that act to radiate the transmission signal and/or to receive the reflected signal. The lattice structure is positioned proximate the transmission line array structure 124 such that the signal fed into the transmission lines of the array structure 124 are received at the lattice.

FIG. 2 illustrates a feed distribution module 116 that provides a corporate feed dividing the transmission signals received for propagation to multiple super elements. Each super element is a row or column of the radiating array structure 126. In this example, the feed distribution module 116 is a type of power divider circuit. The input signal is fed in through the various paths. This configuration is an example and is not meant to be limited to the specific structure disclosed.

Within the feed distribution module 116 is a network of paths, wherein each of the division points is identified according to a division level. The feed distribution module 116 receives input signals, which propagate through the network of paths to the transmission array structure 124. In this example, the paths have similar dimensions; however, the size of the paths may be configured to achieve a desired transmission and/or radiation result. In the present example, the transmission line 144, or path portion, is at LEVEL 1, which is the level of paths feeding the super elements of the transmission array structure 124. The transmission line 144 includes a portion of reactance control module 146, which acts to change the reactance of the transmission line 144 resulting in a change to the signal propagating through the transmission line 144 to the super elements 140, 141. The portion of reactance control module 146 is incorporated into transmission line 144 in the present example. There are a variety of ways to couple the reactance control module 146 to one or more transmission lines. As illustrated, the other paths of LEVEL 1 have reactance control mechanisms that may be the same as that of transmission line 144.

The transmission lines of the feed distribution module 116 reside in the substrate of the radiating structure 200. Transmission line 144 is coupled to super elements 140 and 141, such that the reactance control module 146 effects both super elements. Note, the reactance control mechanism may be positioned otherwise within the paths leading to one or more super elements and may be distributed across the super elements in a patterned fashion, random or otherwise.

Figure 3:
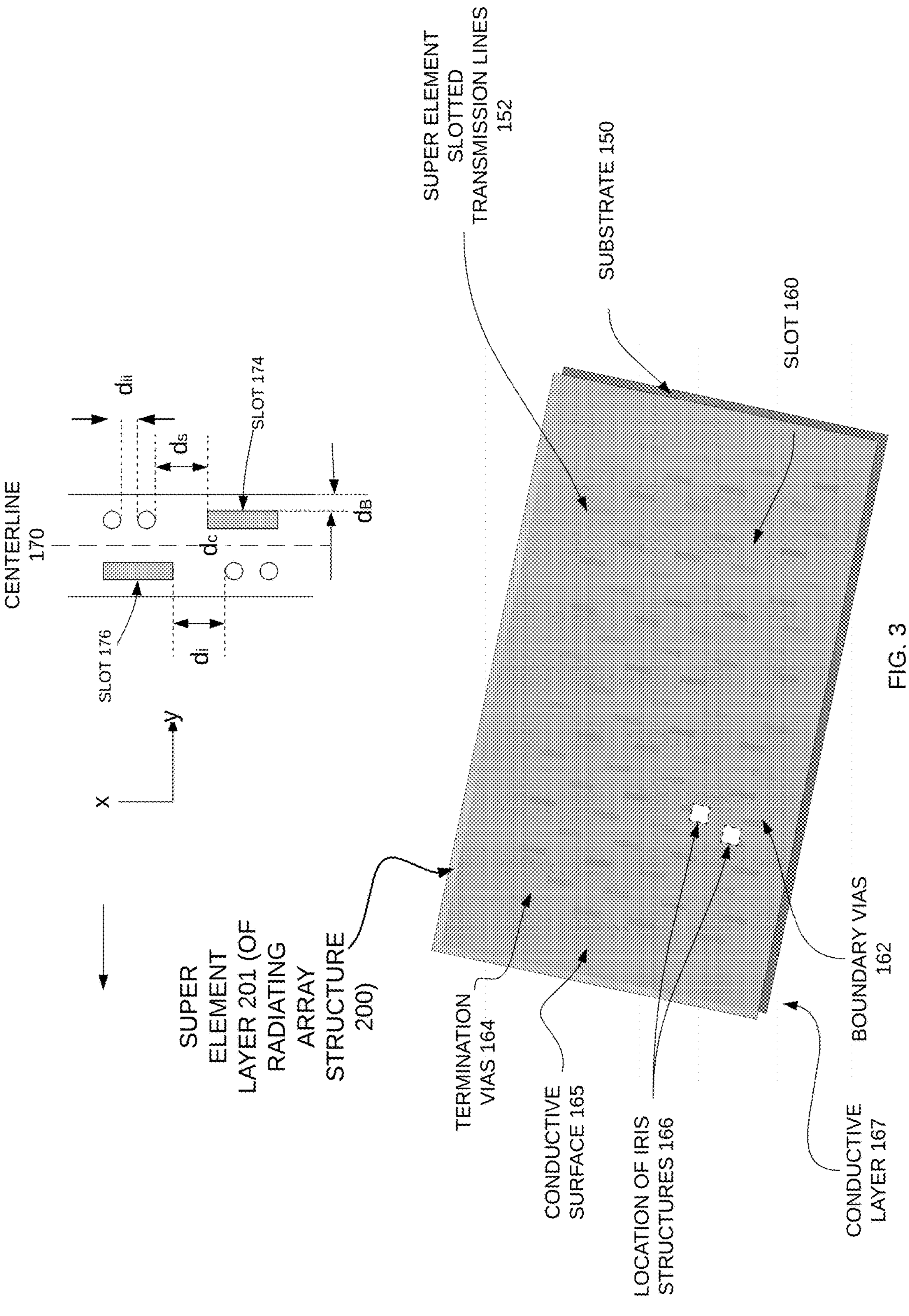
FIG. 3 illustrates antenna structures, according to various examples.

FIG. 3 illustrates a top view of a super element layer 201 which is part of the transmission array structure 124 within radiating structure 200, according to some examples. The radiating structure 200 is a composite substrate, having multiple layers, wherein the layer 201 illustrated is formed of two conductive layers and a dielectric layer, substrate 150, therebetween. A substrate, such as a Rogers material, having specific parameters, such as low dielectric loss, and so forth, that are applicable to high frequency circuits may be used. For example, a Rogers CLTE-AT product exhibits thermal and phase stability across temperature and is used in automotive radar and microwave applications. The layer 201 illustrated is a portion of substrate 150 wherein transmission lines are configured for propagation of a transmission signal from the input to each transmission line.

As illustrated in FIG. 3, a pair or set of transmission lines forms a super element of slotted transmission lines 152. The signal propagates through the super elements 152, radiating through discontinuities in the conductive surface 165. The radiating array structure 126 (not shown in FIG. 3) is positioned above the conductive surface 165 and includes the MTS or MTM elements that receive the signals from layer 201 and generate the transmission beams. Each element of the radiating array structure 126 is designed and configured to support the specified radiation patterns. In this example, the radiating array structure 126 is configured to overlay the conductive surface 165 of layer 201. This portion of the transmission array structure 124 includes multiple super elements 152, each of which behave similar to a slotted wave guide but are positioned to feed the signal to radiating array structure 126. The radiating elements may take any of a variety of forms, including MTS, MTM, conductive patches and combinations thereof.

To improve performance and reduce losses, the illustrated example positions iris structures 166 in the substrate 150 to direct and maintain the radiated signals to the radiating array 165. Irises may be positioned in a variety of configurations depending on structure and application of the antenna array. The location of iris structures 166 is an example, where two irises are positioned opposite a slot with respect to centerline 170.

The antenna structure of FIG. 3 may be referred to as a type of Slotted Wave Guide Antenna ("SWGA"), wherein the SWGA acts as a feed to the radiating array structure 126. The SWGA portion includes the following structures and components: a full ground plane, a dielectric substrate, a feed network, such as direct feeds to the multi-ports transceiver chipset, an array of antenna or complementary antenna apertures, such as slot antenna, to couple the electromagnetic field propagating in the Substrate Integrated Waveguide ("SIW") with radiating structures located on the top of the antenna aperture. The feed network may include passive or active lump components for matching phase control, amplitude tampering, and other RF enhancement functionalities. The distances between the radiating structures may be much lower than half the wavelength of the radiating frequency of the transmission signal. Active and passive components may be placed on the radiating structures with control signals either routed internally through the radiating structure 200 or externally through, or on upper portions of, the substrate.

Alternate examples may reconfigure and/or modify the radiating structure 200 to improve radiation patterns, bandwidth, side lobe levels, and so forth. The SWGA loads the radiating structures to achieve the desired results. The antenna performance may be adjusted by design of the radiating structure 200 features and materials, such the shape of the slots, slot patterns, slot dimensions, conductive trace materials and patterns, as well as other modifications to achieve impedance matching and so forth. The substrate may incorporate two portions of dielectric separated by a slotted transmission line positioned therebetween. The slotted transmission line sits on a substrate 150, wherein each transmission line is within a bounded area; the boundary is a line of vias 162 cut through the conductive layer 165. The slots 160 are configured within the conductive layer 165 and spaced as illustrated in FIG. 3, where, in the present example, the slots 160 are positioned symmetrically with respect to a center line of a super element. For clarity of understanding, FIG. 3 illustrates the slots as equidistant from a center line, such as centerline 170, where slots 174 and 176 are on opposite sides of the centerline 170 but are equidistant to the center line 170 and staggered along the direction thereof. Each bounded transmission line is referred to herein as a "super element," such as super element transmission lines 152.

A small portion of a super element is illustrated in the cut-out, having slots 174, 176 with respect to the center line 170. The boundary vias 162 form the transmission line. The slots are staggered and have a distance in the x-direction of dx. The distance in the y-direction from the edge of a slot to the boundary via is given as dB, and the distance from the centerline 170 to the slot is given as dC. These dimensions and positions may be altered to achieve a desired resultant beam and steering capability.

Figure 4:
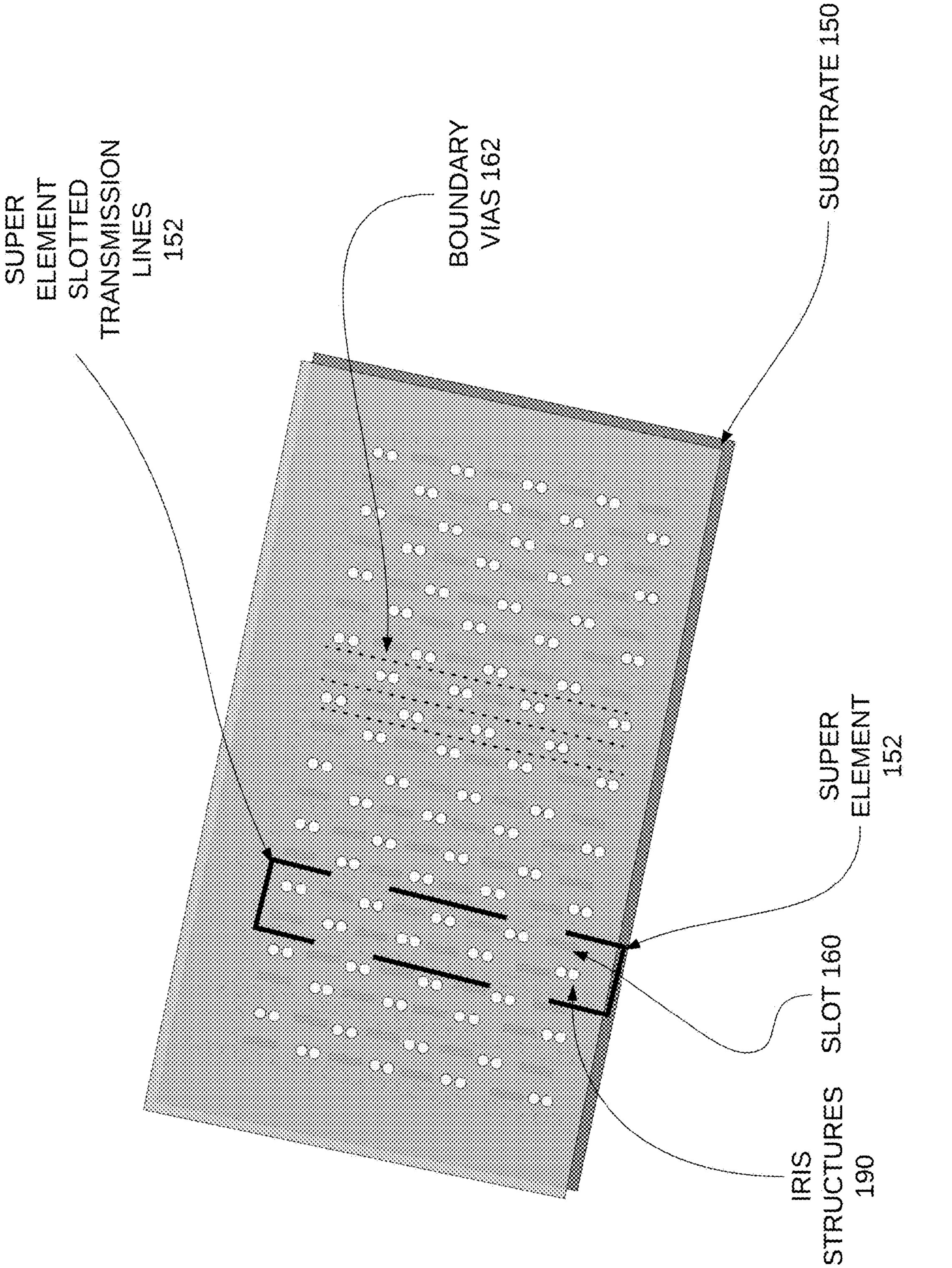
FIGS. 4 and 5 illustrate substrates having metamaterial superstrates and metamaterial loading elements, according to various examples.

FIG. 4 illustrates super elements, such as super element 152, positioned with length along the x-direction. The portion of transmission array structure 124 has boundary vias 162 positioned along the length of the super element 152 in the x-direction. Iris structures 190 are formed through the conductive layer 165 at the positions illustrated and act to contain the radiation pattern within each super element to improve the strength of the radiated signal through the slots 160. The iris structures 190 are illustrated as two vias opposite a slot. The distance between sets of iris structures 190 in the x-direction is di, the distance between the slot 160 and the set of iris structures 190 in the y-direction is ds, and the distance between the set of iris structures 190 and the edge of a slot is illustrated as de. The various distances, positions and configurations of iris structures 190 may be adjusted, changed and designed according to application. These may be implemented at various location along the super elements and may include any number of vias depending on the desired radiation pattern and antenna behavior. In the present example, the iris structures 190 are vias and each iris 190 is similarly shaped and sized as other iris structure 190. Other examples may implement different shapes, configurations and sizes to achieve a desired result for an application, such as that of FIG. 5 which illustrates a portion of a transmission array having iris structures 190 positioned closer to an edge of the slots.

Figure 5:
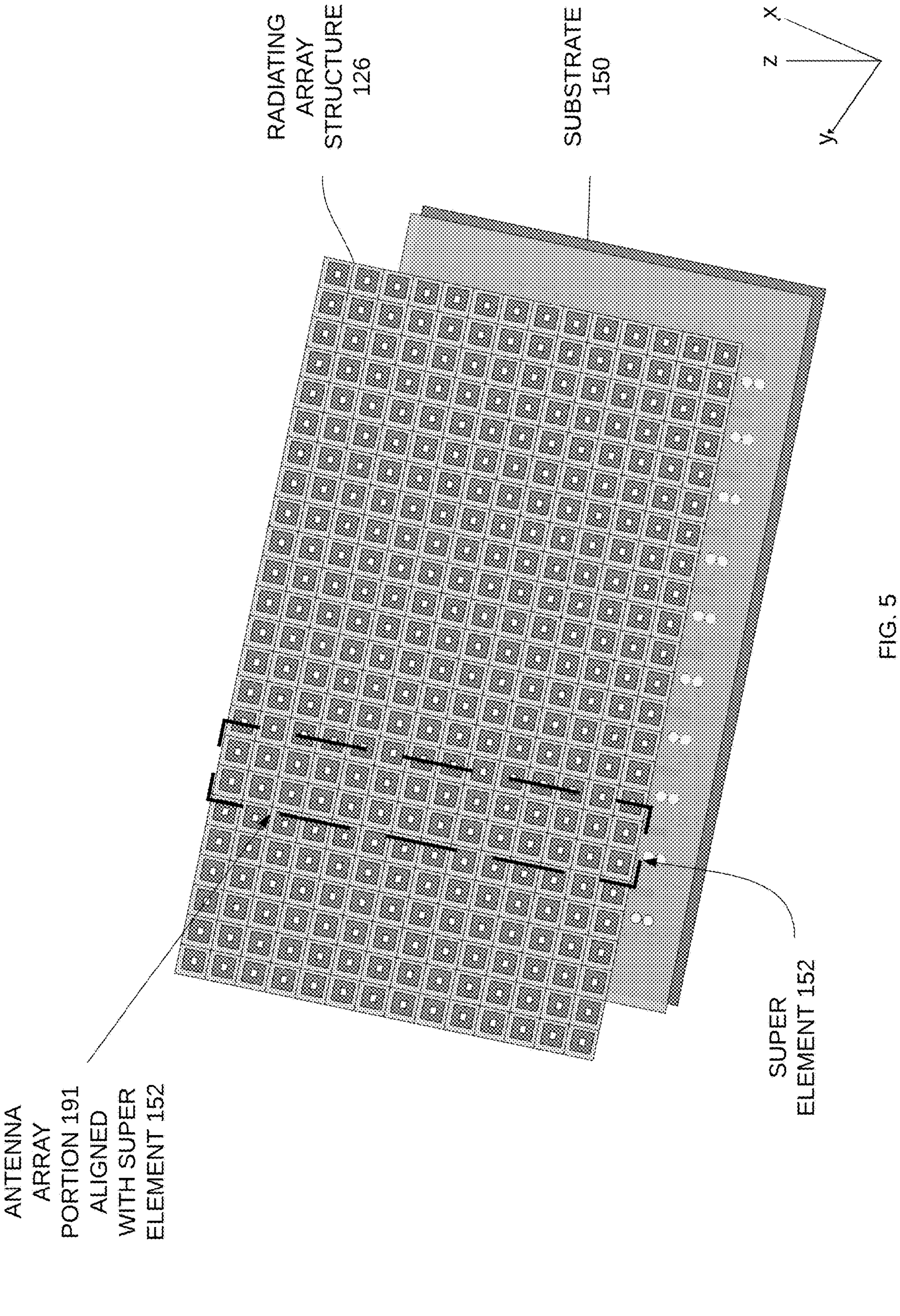

FIG. 5 illustrates a top composite view of portions of radiating structure 200, as in FIG. 1, wherein radiating array structure 126 is positioned proximate transmission array structure 124, as illustrated, the radiating array structure 126 sits above the transmission array structure 124 in the z-direction, which is the direction in which signals will radiate. The radiating array structure 126 is made up of a pattern of MTS or MTM elements. These are positioned with respect to the super elements of transmission array structure 124. For example, dashed lines delineate the super element 152; a corresponding subarray 191 interacts with super element 152 for transmission of signals. The radiating array structure 126 is configured to receive a transmission signal from the slots of the super elements 152. The radiating array structure 126 may be coupled to the transmission array structure 124 having one or more layers therebetween. In some examples, there is an air-gap built into the layering between the various layers of the radiating structure 200. The signal from super element 152, for example, is received by subarray 191 and radiated over the air.

In some examples of a transmission array structure 124 and a radiating array structure 126, the super elements of transmission array structure 124 are positioned lengthwise along the x-direction and enable scanning in that direction. In the examples provided herein, the x-direction corresponds to the azimuth or horizontal direction of the radar; the y-direction corresponds to the elevation direction; and the z-direction is the direction of the radiated signal. The radiating array structure 126 is a periodic and uniform arrangement of unit cells positioned to interact with the super elements.

In some examples, the irises are vias formed through all or a portion of the layers of substrate 150. The irises are illustrated in the figures as cylindrical, but may take on other shapes, such as rectangular prism shapes and so forth. The vias are lined with a conductive material and act as an impedance to the wave propagating through the super elements.

As described herein, various conductive structures are used to configure the transmission paths and to maintain signal within those paths. In some cases, vias such as boundary vias 162 are formed along super elements and/or around groupings of radiating elements, and termination vias 164 which form a terminal end to a super element(s). The vias are holes formed from one conductive layer to another, such as from conductive surface 165 through substrate 150 to conductive layer 167. These holes may be filled with a conductive material, or may be holes lined with conductive material. The size, shape, configuration and placement of vias is a function of the design, application and frequency of the applied system, such as a radar system.

As in FIG. 3, the slots are formed within the conductive surface 165 or conductive layer. These enable signals propagating through paths formed in the substrate to radiate through the slots to an upper layer, wherein the upper layer has a plurality of radiating elements. The conductive layer 165 also has iris structures 166 configured within the design. These are also formed as vias through the substrate and are designed to further focus the electromagnetic energy in the desired path. The distance from a slot to an iris or set of irises, di, may be a function of design and there may be a range of values over which this distance may change. As illustrated in FIG. 3, the irises are configured as two vias proximate one another and positioned in the x-direction. There may be iris structures that have more or less vias, and vias may be positioned in a variety of patterns. The distance between the irises, dii, may also be adjusted and the irises may not be configured symmetrically about the centerline. The illustration is provided for clarity but physical implementations are not limited to the illustrated configuration.

Super element 152 of FIG. 4 is outlined for clarity and is defined by the boundary vias 162. Not all of the boundary vias 162 are illustrated, however, they repeat as those illustrated. There are other methods that may be implemented to maintain the integrity of a transmission path that would work in some situations. In some examples, a phase control circuit 130 (FIG. 1) provides changes in phases of signals provided to the radiating array structure 126. Such phase control circuit 130 changes the phase of signals propagating through transmission array structure 124 and/or presented to radiating array structure 126.

Figure 7:
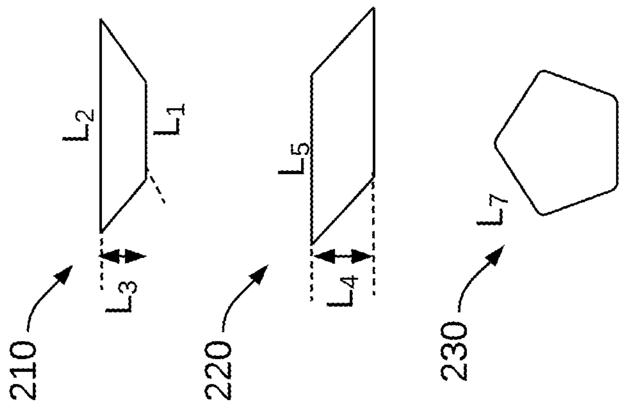
FIG. 7 illustrates various shapes for slots within a super element, according to various examples.
Figure 6:
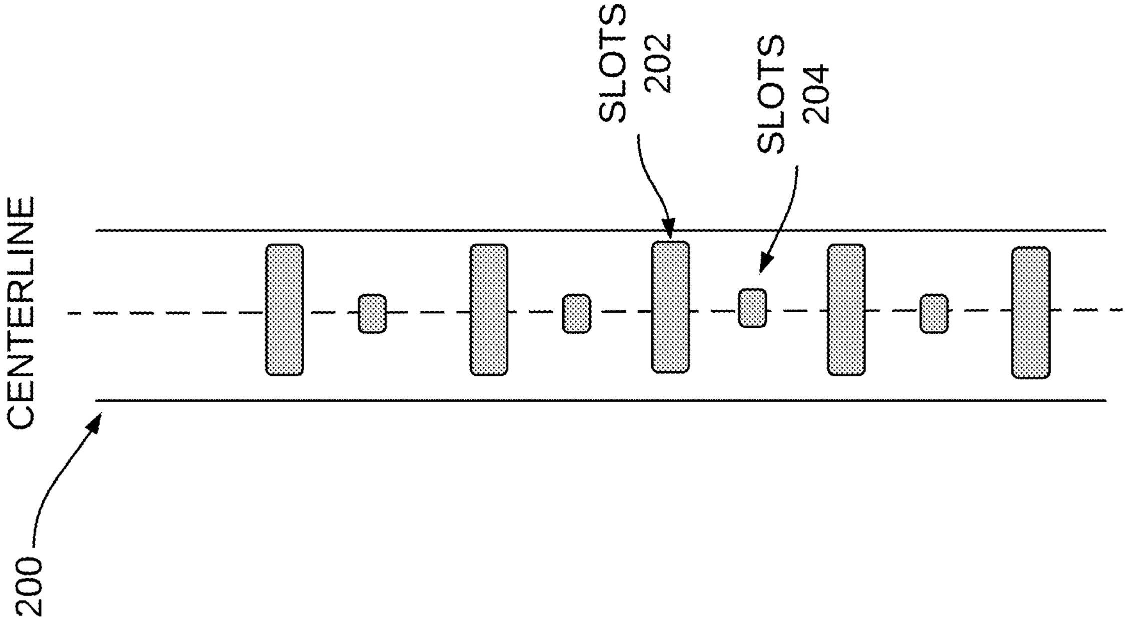
FIG. 6 illustrates a configuration of slots in a super element in accordance to various examples.
Figure 8:
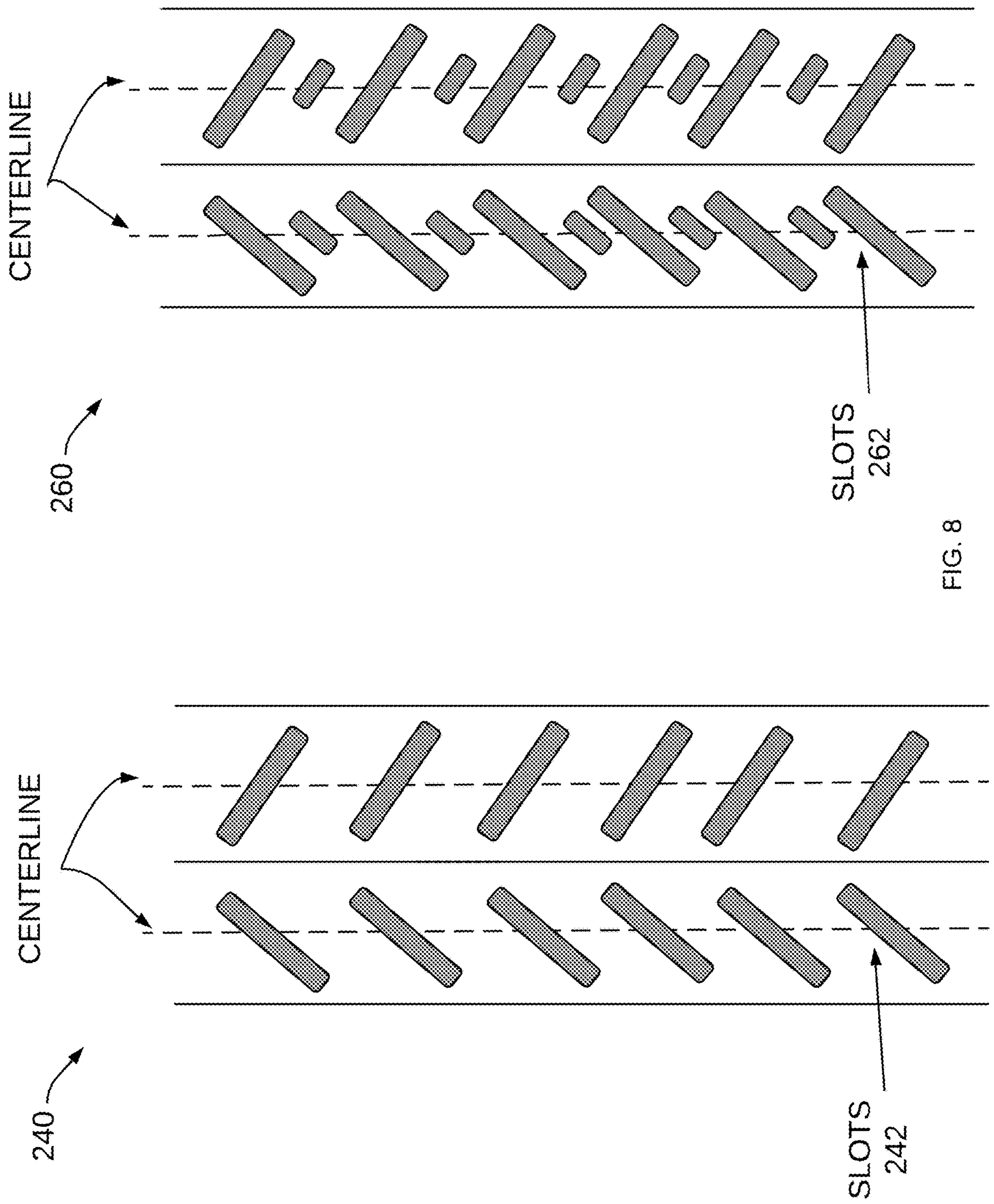
FIG. 8 illustrates various slot configurations for super elements, according to various examples.
Figure 9:
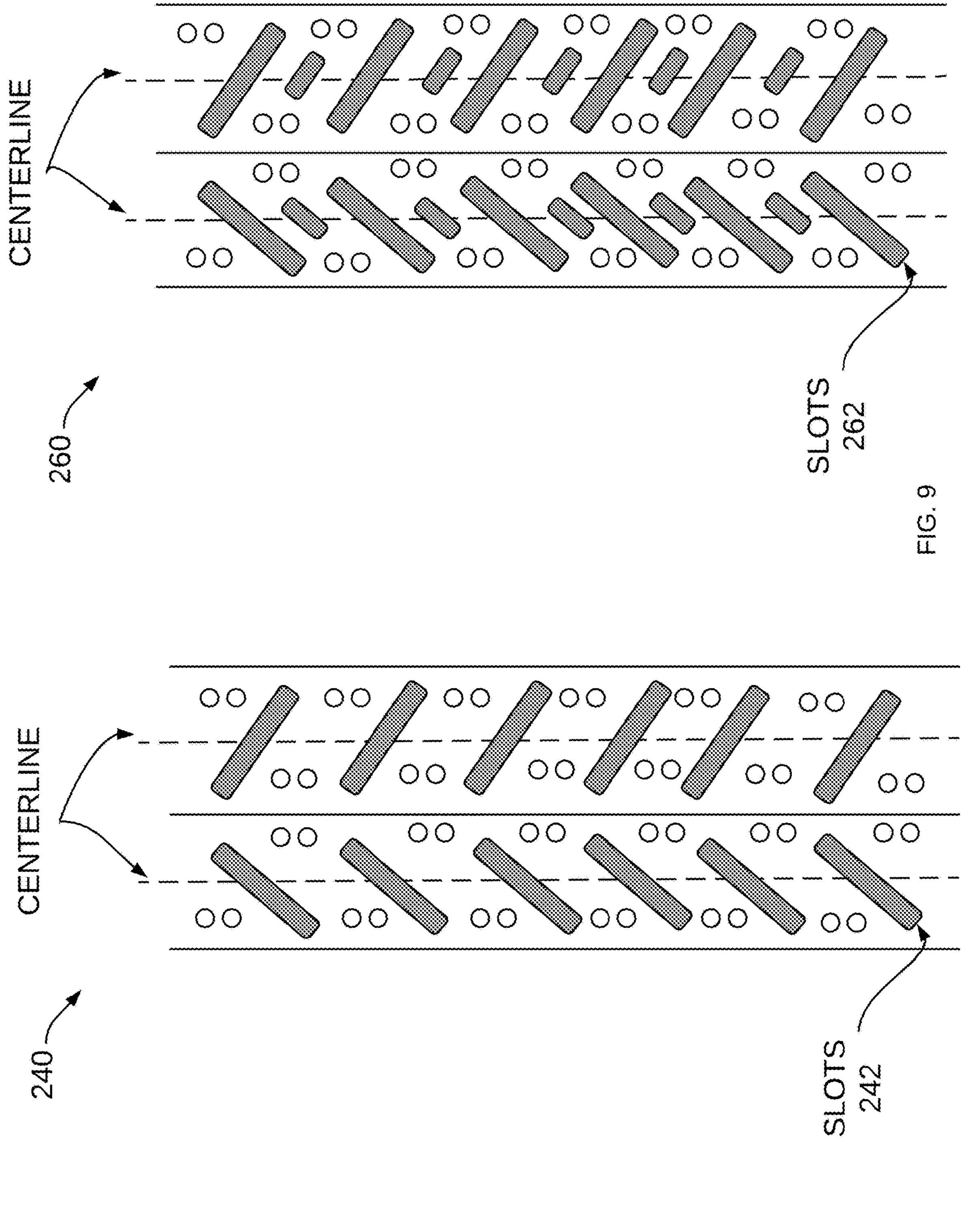
FIGS. 9 and 10 illustrate various slot configurations for super elements having iris configurations therein, according to various examples.
Figure 10:
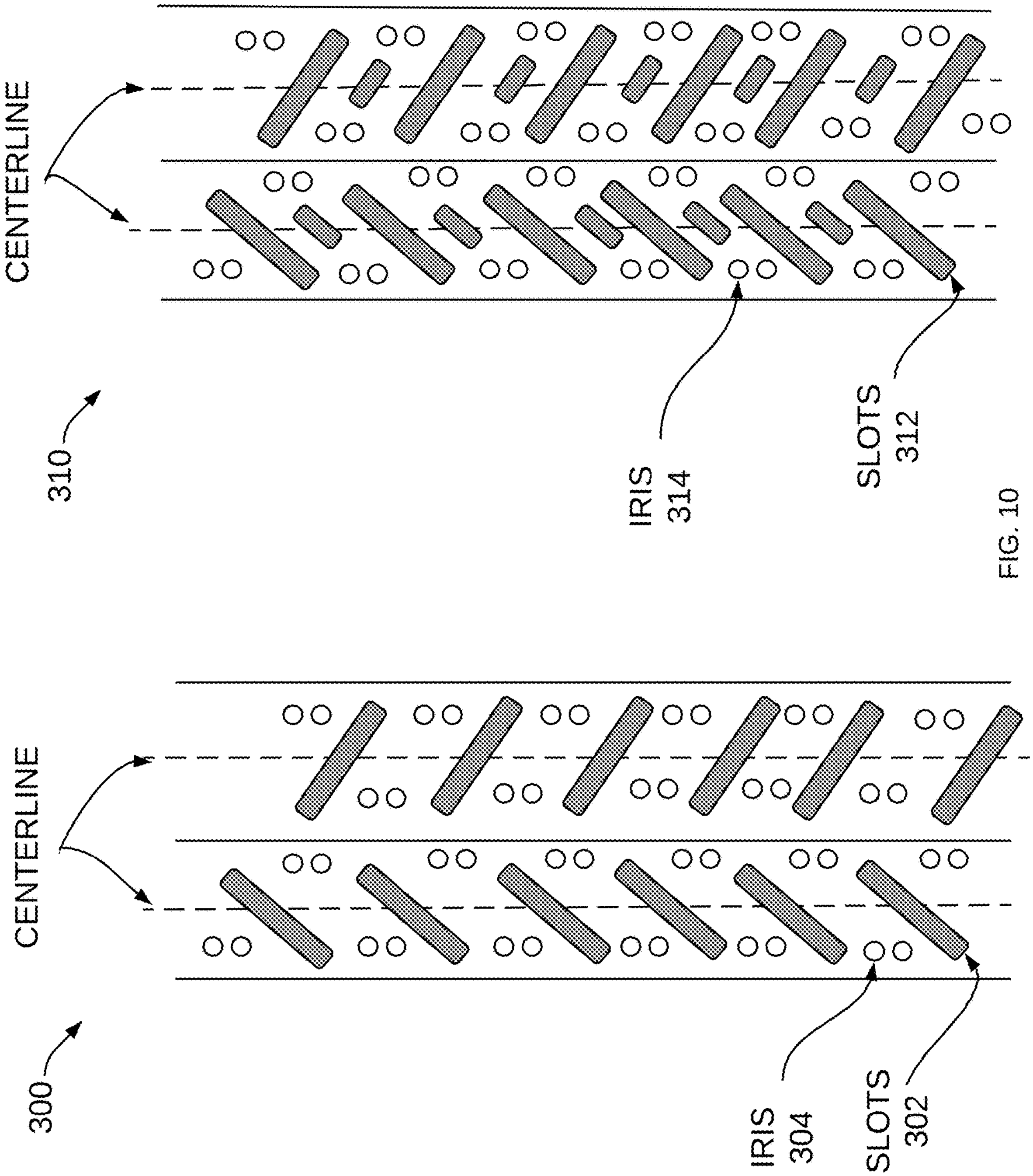

Note that the slots in substrate 150 can have different configurations. For example, FIG. 6 illustrates a configuration for a super element having a plurality of slots 202 positioned orthogonal to the length of the super element. Interspersed the slots 202 are slots 204, which are smaller than the slots 202. FIG. 7 illustrates various shapes for the slots within a super element, where slot shape 210 is a trapezoid having different side lengths $L_1$, $L_2$, and a height of $L_3$. The shape 210 may be positioned in any of a variety of orientations within a super element, so as to optimize a signal having a desired frequency range. Similarly, shape 220 is a parallelogram having a length $L_5$ and height $L_4$. Another shape 230 is a hexagon with side length $L_7$. These provide a sampling of the types of shapes that may be used for the slots in the super element. These may be used with varying sizes, orientations and combinations. FIG. 8 illustrates two configurations for slots within a super element, where the slots are provided on a diagonal along the length of the super element. In super element 240, the slots 242 are all the same size and are angled toward each other. In super element 260, the slots 262 and 264 are interleaved along the length of the super element 260. The slots 264 are smaller than the slots 262. FIG. 9 illustrates the super elements 240, 260 having irises configured along the sides of the super elements. Iris configurations 246 are positioned along super element 240 and iris configurations 266 are positioned along super element 260. FIG. 10 illustrates various super elements having configurations that are asymmetric. Super element 300 has slots 302 configured with iris 304 structures. Super element 310 has slots 312 and iris 314 structures.

The present examples provide methods for supplying transmission signals to radiating elements through multiple layers including dielectric layers and conductive layers. Radiating element arrays are positioned over a set of layers such that the radiating elements transmit the signals over the air. The present examples are applicable to several wireless applications and are particularly applicable to radar applications.

The present examples provide methods and apparatuses for radiating a signal, such as for radar or wireless communications, using a lattice array of radiating elements and a transmission array and a feed structure. The feed structure distributes the transmission signal throughout the transmission array, wherein the transmission signal propagates along the rows of the transmission array and discontinuities are positioned along each row. The discontinuities are positioned to correspond to radiating elements of the lattice array. The radiating elements are coupled to an antenna controller that applies voltages to the radiating elements to change the electromagnetic characteristics. This change may be an effective change in capacitance that acts to shift the phase of the transmission signal. By phase shifting the signal from individual radiating elements, the system forms a specific beam in a specific direction. In some examples, the radiating elements are MTS or MTM elements. These systems are applicable to radar for autonomous vehicles, drones and communication systems. The radiating elements have a hexagonal shape that is conducive to dense configurations optimizing the use of space and reducing the size of a conventional antenna.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A radar system, comprising:

an array of radiating elements;

a slotted waveguide positioned proximate the array of radiating elements, the slotted waveguide comprising: a plurality of transmission lines defined by a plurality of boundary lines, and a first set of slots interspersed with a second set of slots in a single-slot alternating arrangement along a central line of each transmission line, slots in the first set of slots and the second set of slots intersecting the central line, the second set of slots having a size smaller than the first set of slots;

an antenna control circuit adapted to control phases of signals to the array of radiating elements to achieve radiation beam directivity;

an artificial intelligence engine receiving return signals from the array of radiating elements, wherein the boundary lines of each transmission line comprise boundary vias; and a plurality of irises positioned within the boundary lines of each transmission line.

2. The radar system as in claim 1, wherein the array of radiating elements is configured into super elements.

3. The radar system as in claim 2, wherein the irises formed in the slotted waveguide maintain the integrity of a transmission signal.

4. The radar system as in claim 1, wherein the plurality of irises are positioned proximate to each of the first set of slots the second set of slots, wherein the array of radiating elements is proximate the plurality of transmission lines.

5. The radar system as in claim 1, wherein the slots in the first set of slots and the second set of slots are evenly spaced along the central line of each transmission line.

6. The radar system as in claim 1, wherein the slots in the first set of slots and the second set of slots are orthogonal to the central line of each transmission line.

7. The radar system as in claim 1, wherein the slots in the first set of slots and the second set of slots are positioned in a diagonal along the central line of each transmission line.

8. The radar system as in claim 4, wherein the plurality of irises comprises a plurality of vias positioned in sets of a pair of vias opposite each slot in the second set of slots.

9. The radar system as in claim 4, further comprising a reactance control mechanism for adjusting a phase of the array of radiating elements.

10. The radar system as in claim 9, wherein the reactance control mechanism comprises at least one varactor coupled between two conductive areas of a radiating element in the array of radiating elements.

11. The radar system as in claim 10, wherein the array of radiating elements comprises at least one meta-structure element.

12. The radar system as in claim 10, wherein the array of radiating elements comprises at least one metamaterial element.

13. The radar system as in claim 10, wherein the array of radiating elements comprises at least one conductive patch element.

14. The radar system as in claim 10, wherein radiating elements in the array of radiating elements are configured periodically.

15. The radar system as in claim 10, wherein the array of radiating elements comprises different sized elements.

16. The radar system as in claim 1, further comprising: a reactance control module configured to change a behavior of the array of radiating elements, wherein a transmission array structure includes the transmission lines coupled to the array of radiating elements and feeding a transmission signal through to the array of radiating elements.

17. The radar system as in claim 16, wherein the array of radiating elements comprises meta-structures.

18. The radar system as in claim 17, further comprising a phase shift circuit adapted to change a phase of a transmission signal.

19. The radar system as in claim 16, further comprising a phase shift circuit adapted to change a phase of a transmission signal.

20. The radar system as in claim 1, wherein each of the irises is located on either side of each slot of the second set of slots along a direction perpendicular to the central line and sandwiched by two adjacent first set of slots along the central line.

* * * * *